Feb. 2, 1932.    A. A. CAILLE    1,843,479
PERSONAL WEIGHING SCALE
Filed Feb. 19, 1931    2 Sheets-Sheet 1
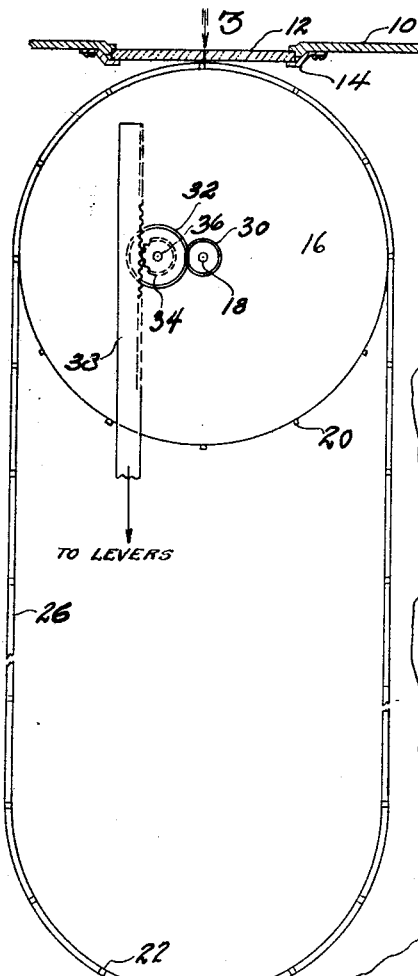
FIG.1
FIG.2
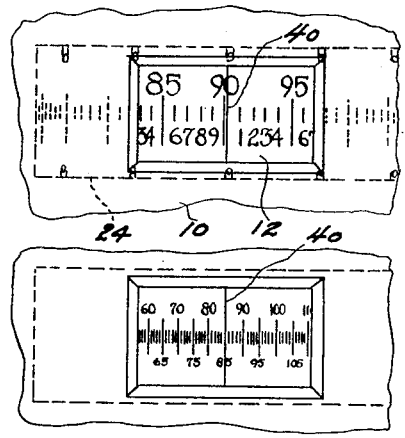
FIG.3
FIG.4
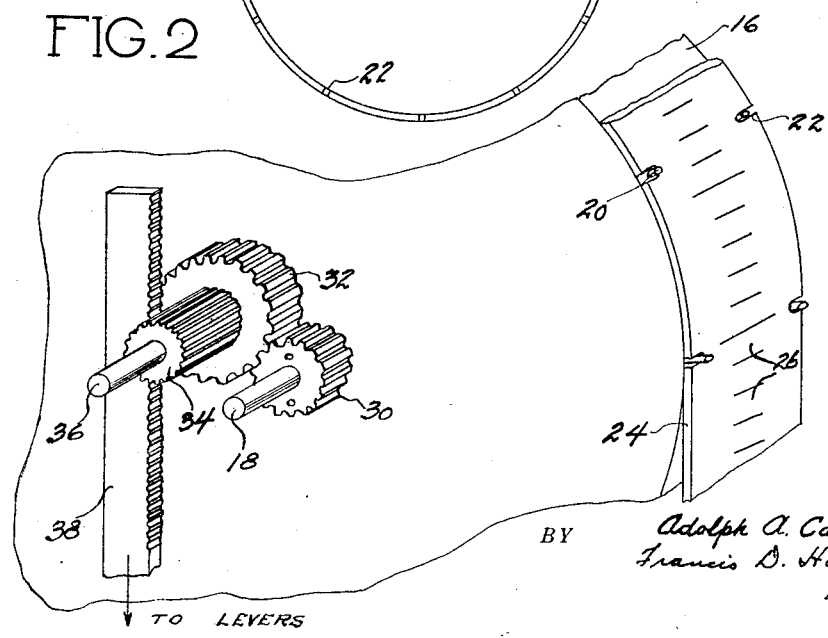
INVENTOR
Adolph A. Caille.
BY Francis D. Hardesty.
ATTORNEY Feb. 2, 1932.        A. A. CAILLE        1,843,479

PERSONAL WEIGHING SCALE

Filed Feb. 19, 1931        2 Sheets-Sheet 2

INVENTOR
Adolph A. Caille
BY Francis D. Hardesty.
ATTORNEY

Patented Feb. 2, 1932

1,843,479

UNITED STATES PATENT OFFICE

ADOLPH A. CAILLE, OF DETROIT, MICHIGAN, ASSIGNOR TO CAILLE MOTOR COMPANY, OF DETROIT, MICHIGAN, A CORPORATION OF MICHIGAN

PERSONAL WEIGHING SCALE

Application filed February 19, 1931. Serial No. 517,069.

This invention relates to weight indicating mechanisms particularly adapted for use with personal weighing scales of the type disclosed in the design patent of Harry Knupp, No. 82,748, issued December 9, 1930, and this application is to be regarded as a continuation in part of my application Ser. No. 508,013, filed January 12, 1931.

For scales of this character which generally have a capacity of 300 lbs., it is the common practice to provide a reading or top plate in which is a lens covered aperture thru which is visible a portion of the periphery of the indicating wheel mounted below the lens. The surface of the wheel is marked for units of weight, and since the wheels are about six inches in diameter, the marks are so spaced that one inch of the wheel's circumference is equivalent to about sixteen lbs. Accordingly, if the wheel be marked for single pounds, there will be about sixteen marks to the inch. Obviously such closely spaced marks are not readily readable thru the lens and various expedients have been proposed to solve the difficulty thus presented.

For example, it has been proposed to use a magnifying lens to cover the reading plate aperture, the lens serving to magnify the spacings and make it easier to read the weight. This expedient has not proven satisfactory, since magnifying lenses are not as clearly transparent as are plain lenses. Further, since they are thick, they distort the figures and spacings, especially if the observer looks down upon the plate from one side of the center line of the lens. Further, since small size wheels or closely marked wheels cannot be and are not provided with unit weight enumerating digits, the reader must count back or count forward from a five or ten pound mark to ascertain the correct weight. Inaccuracies and errors in the reading of the weight often occur, even if a magnifying lens be used, as will be obvious.

It is suggested, therefore, that there be provided a tape having such a length that even if it be marked for 300 lbs., the markings will be spaced relatively far apart. For example, if a 75 inch tape be used, the markings will be spaced only four to the inch for unit pounds. To use such a long tape in a scale of this character there is provided a wheel substantially as large as that formerly used, and located under the reading plate lens, which need not be of magnifying glass but which may be of plain glass, as thin as desired. The wheel may be about six inches in diameter, or exactly 18.75 inches in circumference, and if so proportioned, will rotate four times, on full range movement of the scale, to present the 75 marked inches of the tape.

The wheel and tape are preferably provided with means to create a friction clutch between them, such means resembling those commonly used on motion picture film reel.

A multiplying gearing is used to connect the rack rod of the scale with the wheel, and it will be observed that the gearing should be such that for full range movement the wheel will revolve a number of times, the number being equal to the ratio of the tape length to wheel circumference.

An object of this invention, therefore, is a weight indicating construction, such as the one above described.

Still further objects will readily occur to those skilled in the art upon reference to the following description and the accompanying drawings in which Fig. 1 is an elevation view of parts embodying the invention.

Fig. 2 is a perspective view to larger scale of operating parts of the mechanism.

Fig. 3 is a view of the reading plate and lens, as if on arrow 3 of Fig. 1.

Fig. 4 is a view of a reading plate and plain lens of a prior art scale.

Figure 5:
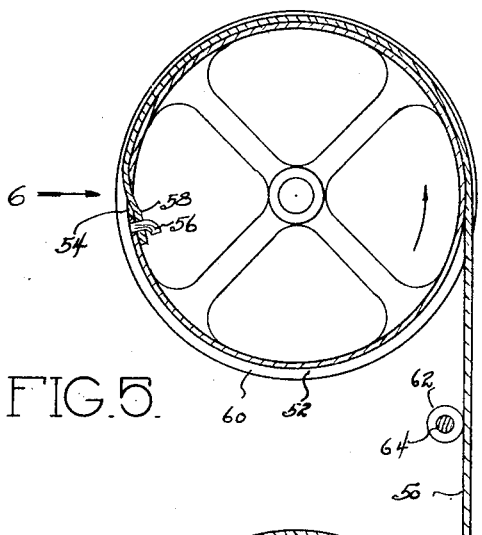
Fig. 5 shows a modification and is a section on line 5—5 of Fig. 6.
Figure 6:
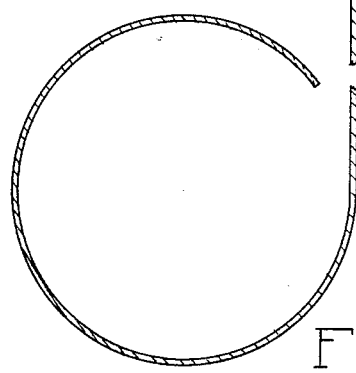
Fig. 6 is a side view of Fig. 5 on arrow 6.

Referring to Figs. 1–3 inclusive, it will be seen that the weight indicating mechanism of the scale includes a top or reading plate 10 having an aperture therein which is covered by the plain lens 12, secured in place by the edge piece 14. Under the top plate and aligned with the aperture is a wheel 16, mounted on a shaft 18 so as to rotate under the lens.

The periphery of the wheel is provided with a number of spaced pins 20 which fit into notches 22, equally spaced in the edges 24 of the reading tape 26, so as to form a positive or friction clutch between the wheel and tape.

Secured to and mounted on the wheel 16 and shaft 18 is a gear 30 meshing with the gear 32 of the compound gear unit, which includes the gear 34, the compound gear unit being mounted on the independent shaft 36. The gear 34 meshes with the rack 38, connected to the weighing levers, and it will be seen that movement of the rack 38, in response to the weight effect, causes the wheel 16 to rotate, thus causing the markings on the tape 26 to be presented under the lens 12.

In order to illustrate the proportioning of the parts embodying the invention, specific dimensions will be given, although it will be understood that such dimensions and proportions serve only to disclose the invention, and do not serve to define or limit the same.

For example, the tape may have an effective marked length of 75 inches, though its actual length may be greater, portions thereon in such cases serving no useful purpose in this connection. If the scale be of 300 lb. capacity, the unit markings will be .25 inches from one another. The wheel 16 will be 5.96 inches in diameter or 18.75 inches in circumference and will rotate four times for full range movement.

The teeth ratio of rack 38 and gear 34 will to be 2:1 and the teeth ratio of gears 32 and 30 will be the same 2:1, so that the gear 30 (and wheel 16) will rotate four times for full range movement of the rack 38.

Figs. 3 and 4 illustrate, effectively, the difference between the construction of this invention with constructions heretofore used. For example, in Fig. 3, showing the present construction, the unit markings being spaced .25 inches from one another, to permit the printing of unit digits, as well as five pound and ten pound digits. The digits are large and easily readable, and no counting back or forward is needed to read the weight. Further, the hair line 40 does not occupy much of the space between unit markings, and accordingly fractions of pounds may be read, without difficulty. In the construction of Fig. 4, where the markings are placed directly upon the wheel, the unit markings being spaced .0625 inches from one another, do not permit the printing of unit digits. The five pound digits, if provided, and the ten pound digits are small and hardly readable. Counting back or forward, to read the weight is necessary and no fractional pound readings can be obtained.

In the construction shown, the total length of the tape is considered as the effective length, it will be seen that there may be used a tape whose effective length is less than its actual length, and it is intended that "tape length" as used in the claims shall be considered only as "effective tape length".

In the form of Fig. 5, one end of the tape 50 is fastened to the periphery of the wheel 52, the later being mounted on a shaft (not shown), the other end of the tape hanging free. The periphery is slotted, as at 54 and is provided with pins 56 over which the end 58 of tape 50 is hooked, after it is passed thru the slot 54. The wheel is provided with flanges 60 to maintain the loops of the ribbon in alignment. Further, a roller 62, mounted on stationary shaft 64 tends to uncurl the free end of the tape, as the wheel rotates counter-clockwise.

Figure 7:
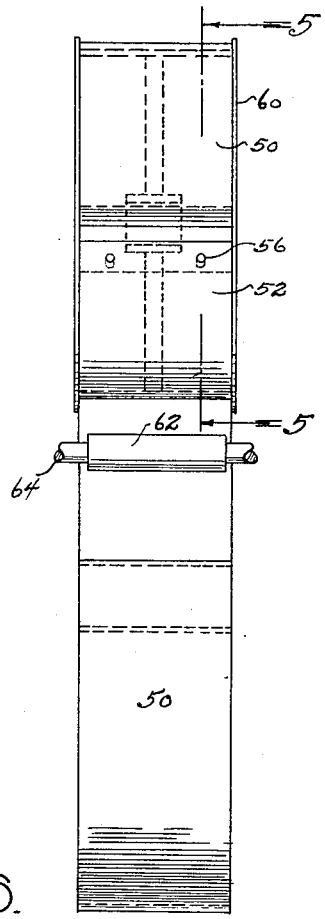
Fig. 7 shows a modification, and is a section on line 7—7 of Fig. 8.
Figure 7:
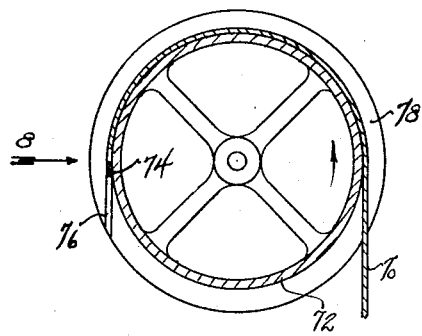
Figure 8:
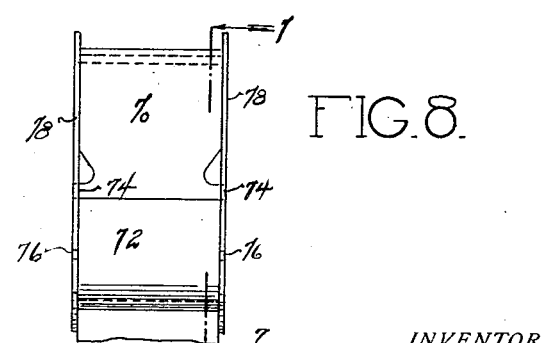
Fig. 8 is a side view of Fig. 7 on arrow 8.

In the form of Fig. 7 also a double ended tape 70 is employed, and the end thereof to be fastened to the wheel 72, is provided with outwardly projecting hooks or elements 74 hooked in the slots 76 on the flanges 78 of the wheel.

Now having described the invention and the preferred embodiment thereof, it is to be understood that the said invention is to be limited, not to the specific details herein set forth, but only by the scope of the claims which follow.

What I claim is:

1. In a scale, a substantially horizontal reading plate having a relatively small aperture therein, a substantially horizontal lens in and forming a transparent cover for the aperture, a wheel under said lens, weight responsive means to cause said wheel to rotate, and a tape depending from said wheel and secured thereto so as to wrap around the wheel and having weight indicating marks thereon and mounted on said wheel so as to be presented under said lens, said tape being much greater in length than the circumference of said wheel.

2. In a scale, a substantially horizontal reading plate having a relatively small aperture therein, a substantially horizontal lens in and forming a transparent cover for the aperture, a wheel under said lens, weight responsive means to cause said wheel to rotate, and a tape depending from said wheel and secured thereto so as to wrap around the wheel and having weight indicating marks thereon and mounted on said wheel so as to be presented under said lens, said tape being much greater in length than the circumference of said wheel, there being interengaging clutching means on said wheel and tape to provide a positive drive for the latter.

3. In a scale, a reading plate having a relatively small aperture therein, a lens in and forming a transparent cover for the aperture, a wheel under said lens, weight responsive means to cause said wheel to rotate, and a tape having weight indicating marks thereon and mounted on said wheel so as to be presented under said lens, said tape being much greater in length than the circumference of said wheel, the weight responsive means including a rack rod connected to the weighing levers, and gearing operatively connecting the rod and the wheel, the gearing including multiplying gears which cause the wheel to rotate more than once as the rack rod moves over the full capacity range of the scale, the ratio of the tape length to wheel circumference being equal to the number of revolutions made by the wheel on full range movement.

In testimony whereof, I sign this specification.

ADOLPH A. CAILLE.